(12) United States Patent
Sakuma et al.

(10) Patent No.: US 11,285,436 B2
(45) Date of Patent: Mar. 29, 2022

(54) EXHAUST PURIFICATION SYSTEM OF INTERNAL COMBUSTION ENGINE

(71) Applicant: TOYOTA JIDOSHA KABUSHIKI KAISHA, Toyota (JP)

(72) Inventors: Tetsuya Sakuma, Gotemba (JP); Keishi Takada, Ashigarakami-gun (JP); Yasumasa Notake, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 58 days.

(21) Appl. No.: 16/736,064

(22) Filed: Jan. 7, 2020

(65) Prior Publication Data

US 2020/0215482 A1    Jul. 9, 2020

(30) Foreign Application Priority Data

Jan. 8, 2019  (JP) ............................. JP2019-001255

(51) Int. Cl.
*B01D 53/32* (2006.01)
*F01N 3/20* (2006.01)

(52) U.S. Cl.
CPC ......... *B01D 53/326* (2013.01); *F01N 3/2013* (2013.01)

(58) Field of Classification Search
CPC ..... C25B 1/00–04; C25B 15/02; C25B 15/06; C25B 15/023; F01N 3/2013; B01D 53/326

See application file for complete search history.

(56) References Cited

U.S. PATENT DOCUMENTS

| | | | |
|---|---|---|---|
| 5,352,337 A | 10/1994 | Kobayashi et al. | |
| 6,168,705 B1 | 1/2001 | Molter et al. | |
| 6,245,214 B1 * | 6/2001 | Rehg ................... | H01M 8/0662 |
| | | | 205/764 |

(Continued)

FOREIGN PATENT DOCUMENTS

| | | |
|---|---|---|
| DE | 36 44 090 A1 | 7/1988 |
| JP | 2006-189023 A | 7/2006 |

(Continued)

OTHER PUBLICATIONS

Office Action issued in U.S. Appl. No. 16/215,705 dated Feb. 20, 2020.

(Continued)

*Primary Examiner* — Nicholas A Smith
(74) *Attorney, Agent, or Firm* — Finnegan, Henderson, Farabow, Garrett & Dunner, LLP (57) ABSTRACT

An exhaust purification system of an internal combustion engine is provided with an electrochemical reactor provided in an exhaust passage of the internal combustion engine, and a voltage control device controlling a voltage supplied to the electrochemical reactor. The electrochemical reactor is provided with an ion conducting solid electrolyte layer and an anode layer and cathode layer placed on the surface of the solid electrolyte layer. The voltage control device is configured to perform short-circuit detection control detecting short-circuiting between the anode layer and the cathode layer, and energizing control applying current between the anode layer and the cathode layer so to energize the short-circuited part when short-circuiting is detected.

6 Claims, 8 Drawing Sheets

(56) References Cited

U.S. PATENT DOCUMENTS

| | | | |
|---|---|---|---|
| 6,331,232 B1 * | 12/2001 | Lundgren | G01N 27/4075 204/265 |
| 10,794,250 B2 * | 10/2020 | Sakuma | B01D 53/9495 |
| 2004/0009388 A1 | 1/2004 | Faguy | |
| 2005/0040041 A1 | 2/2005 | Sakayanagi | |
| 2007/0186544 A1 | 8/2007 | Elwart et al. | |
| 2009/0145108 A1 | 6/2009 | Koide et al. | |
| 2009/0173623 A1 | 7/2009 | Kato | |
| 2020/0215481 A1 | 7/2020 | Takada et al. | |

FOREIGN PATENT DOCUMENTS

| | | |
|---|---|---|
| JP | 2006-289214 | 10/2006 |
| JP | 2006-346624 | 12/2006 |
| JP | 2009-138522 A | 6/2009 |
| JP | 2009-150299 A | 7/2009 |
| JP | 2012-061449 A | 3/2012 |
| JP | 2012-193698 A | 10/2012 |
| WO | WO 2014/174609 A1 | 10/2014 |

OTHER PUBLICATIONS

Notice of Allowance and Notice of Allowability issued in U.S. Appl. No. 16/215,705 dated Jul. 1, 2020.

Corrected Notice of Allowability issued in U.S. Appl. No. 16/215,705 dated Sep. 9, 2020.

U.S. Appl. No. 16/731,147, filed Dec. 31, 2019.

Office Action issued in U.S. Appl. No. 16/731,147 dated Jun. 15, 2021.

Final Office Action issued in U.S. Appl. No. 16/731,147 dated Oct. 28, 2021.

Advisory Action issued in U.S. Appl. No. 16/731,147 dated Jan. 13, 2022.

* cited by examiner

EXHAUST PURIFICATION SYSTEM OF INTERNAL COMBUSTION ENGINE

FIELD

The present disclosure relates to an exhaust purification system of an internal combustion engine.

BACKGROUND

Known in the past has been an electrochemical reactor provided with an ion conducting solid electrolyte layer, an anode layer placed on a surface of the solid electrolyte layer, and a cathode layer placed on a surface of the solid electrolyte layer (for example, PTL 1). In the electrochemical reactor described in PTL 1, if current flows through the anode layer and the cathode layer, water molecules are broken down on the anode layer whereby protons and oxygen are produced. On the cathode layer, $NO_X$ reacts with the protons whereby nitrogen and water molecules are produced. As a result, the electrochemical reactor can be used to remove the $NO_X$.

CITATIONS LIST

Patent Literature

[PTL 1] Japanese Unexamined Patent Publication No. 2006-346624

SUMMARY

Technical Problem

On an electrochemical reactor used for purifying the exhaust gas of an internal combustion engine, condensed water sometimes deposits, when the internal combustion engine is cold started or while it is stopped. If such condensed water penetrates inside the solid electrolyte layer, the anode layer and the cathode layer sometimes are short-circuited. Further, if an electrochemical reactor has a plurality of cells respectively provided with solid electrolyte layers, anode layers, and the anode layers and the cathode layers of adjoining cells sometimes are short-circuited due to such condensed water.

If short-circuiting occurs between an anode layer and cathode layer in this way, current concentrates at the short-circuiting route, therefore it becomes harder for a chemical reaction to occur on the anode layer and cathode layer. As a result, the purification function of the exhaust gas by the electrochemical reactor is decreased.

Considering the above problems, an object of the present disclosure is to keep the purification function of exhaust gas by an electrochemical reactor from decreasing along with short-circuiting of an anode layer and cathode layer due to deposition of condensed water.

Solution to Problem

The present invention was made so as to solve the above problem and has as its gist the following.

(1) An exhaust purification system of an internal combustion engine, comprising: an electrochemical reactor provided in an exhaust passage of the internal combustion engine; and a voltage control device controlling a voltage supplied to the electrochemical reactor, wherein the electrochemical reactor comprises an ion conducting solid electrolyte layer and an anode layer and cathode layer placed on the surface of the solid electrolyte layer, and the voltage control device is configured to perform short-circuit detection control detecting short-circuiting between the anode layer and the cathode layer, and energizing control applying current between the anode layer and the cathode layer so to energize the short-circuited part when short-circuiting is detected.

(2) The exhaust purification system of an internal combustion engine according to above (1), wherein the voltage control device is configured to further perform, while the internal combustion engine is operating, purification control applying current between the anode layer and cathode layer so as to remove $NO_X$ in the exhaust gas discharged from the internal combustion engine, and the value of the voltage applied between the anode layer and cathode layer during the energizing control is higher than the value of the voltage applied between the anode layer and cathode layer during the purification control.

(3) The exhaust purification system of an internal combustion engine according to above (1) or (2), wherein, in the short-circuit detection control, the voltage control device detects short-circuiting between the anode layer and the cathode layer based on an electrical resistance value between the anode layer and the cathode layer when voltage is applied between the anode layer and the cathode layer.

(4) The exhaust purification system of an internal combustion engine according to any one of above (1) to (3), wherein the electrochemical reactor has a plurality of cells respectively comprising solid electrolyte layers, anode layers, and cathode layers, and these plurality of cells are partially connected in parallel to a power source.

(5) The exhaust purification system of an internal combustion engine according to above (4), wherein among the plurality of cells, cells where condensed water easily pools on the solid electrolyte layer in the structure of the electrochemical reactor are connected in series with each other.

(6) The exhaust purification system of an internal combustion engine according to any one of above (1) to (5), wherein the voltage control device is configured so as to perform the short-circuit detection control and the energizing control while the internal combustion engine is stopped.

Advantageous Effects of Invention

According to the present disclosure, the purification function of exhaust gas by an electrochemical reactor is kept from decreasing along with short-circuiting of an anode layer and cathode layer due to deposition of condensed water.

DESCRIPTION OF EMBODIMENT

Below, referring to the drawings, embodiments will be explained in detail. Note that, in the following explanation, similar component elements are assigned the same reference numerals.

<Explanation of Internal Combustion Engine as a Whole>

Figure 1:
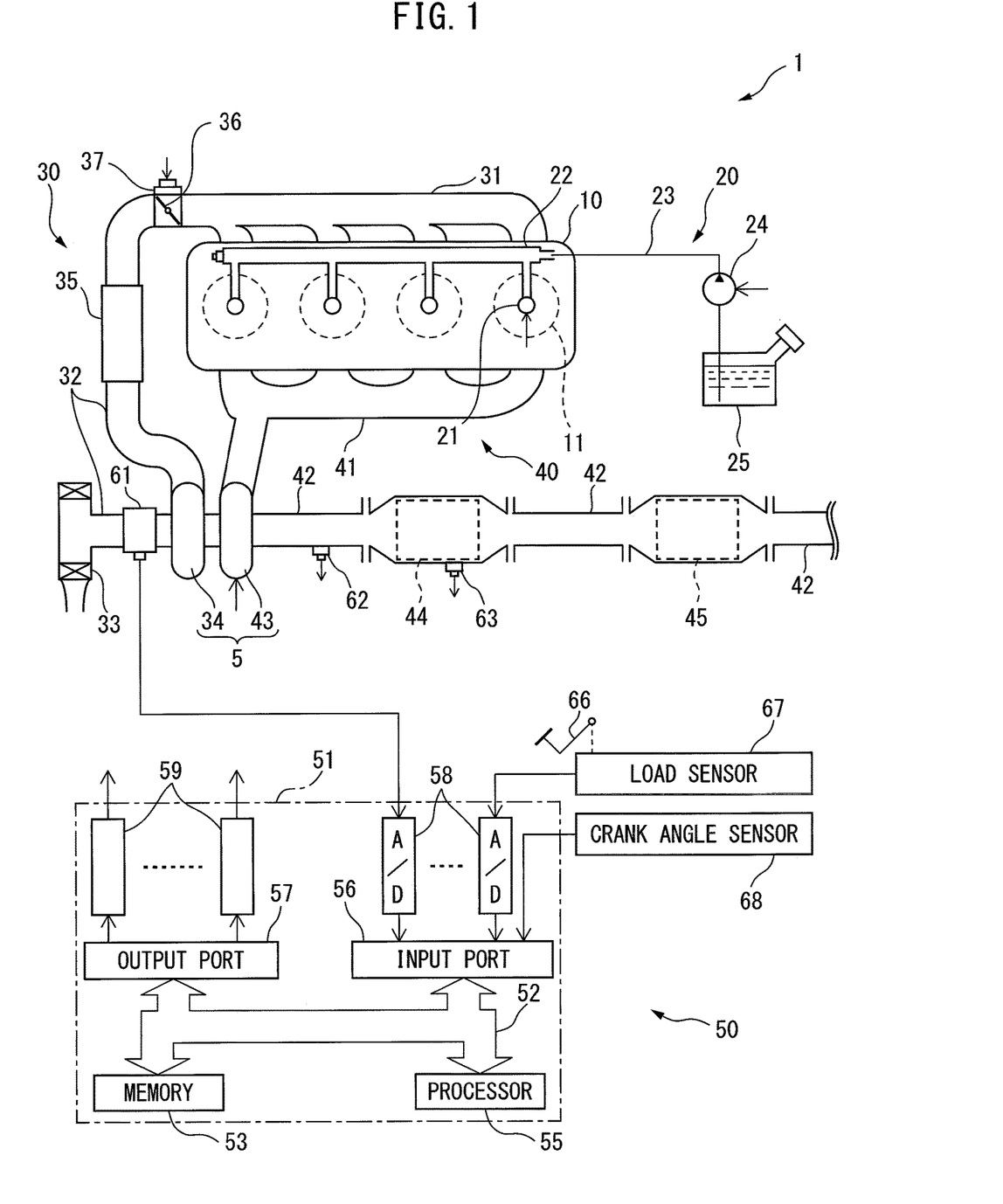
FIG. 1 is a schematic view of the configuration of an internal combustion engine in which an electrochemical reactor is mounted.

First, referring to FIG. 1, the configuration of an internal combustion engine 1 provided with an exhaust purification system according to one embodiment will be explained. FIG. 1 is a schematic view of the configuration of the internal combustion engine 1. As shown in FIG. 1, the internal combustion engine 1 is provided with an engine body 10, fuel feed system 20, intake system 30, exhaust system 40 and control device 50.

The engine body 10 is provided with a cylinder block in which a plurality of cylinders 11 are formed, a cylinder head and a crank case. A piston 14 is arranged in each cylinder 11, and each cylinder 11 is connected to intake ports and exhaust port.

The fuel feed system 20 is provided with fuel injectors 21, a delivery pipe 22, fuel feed pipe 23, fuel pump 24, and fuel tank 25. Each fuel injector 21 is arranged in the cylinder head so as to directly inject fuel into each cylinder 11. The fuel pumped out by the fuel pump 24 is supplied through the fuel feed pipe 23 to the delivery pipe 22, and then is injected from the fuel injector 21 into the cylinder 11.

The intake system 30 is provided with an intake manifold 31, intake pipe 32, air cleaner 33, compressor 34 of a turbocharger 5, intercooler 35, and throttle valve 36. The intake port of each cylinder 11 is communicated through the intake manifold 31 and the intake pipe 32 with the air cleaner 33. The intake pipe 32 is provided with the compressor 34 of the exhaust turbocharger 5 for compressing and discharging intake air flowing through the intake pipe 32, and the intercooler 35 for cooling the air compressed by the compressor 34. The throttle valve 36 is driven so as to be opened and closed, by a throttle valve drive actuator 37. The intake port, intake manifold 31 and intake pipe 32 form an intake passage.

The exhaust system 40 configures a part of the exhaust purification system of the internal combustion engine 1. The exhaust system 40 is provided with an exhaust manifold 41, exhaust pipe 42, turbine 43 of the exhaust turbocharger 5, exhaust purification catalyst 44, and electrochemical reactor (hereinafter, simply referred to as "reactor") 45. The exhaust port of each cylinder 11 is communicated through the exhaust manifold 51 and the exhaust pipe 52 with the exhaust purification catalyst 44, and the exhaust purification catalyst is communicated through the exhaust pipe 42 with the electrochemical reactor 45. The exhaust purification catalyst 44 is, for example, a three-way catalyst or $NO_X$ storage reduction catalyst, and purify composition in the exhaust gas, such as $NO_X$ or unburned HC when the temperature thereof is equal to or greater than a constant activation temperature. In the exhaust pipe 42, the turbine 43 of the exhaust turbocharger 5, which is driven to rotate by the energy of the exhaust gas, is provided. The exhaust port, exhaust manifold 41, exhaust pipe 42, exhaust purification catalyst 44 and reactor 45 form an exhaust passage. Note that the exhaust purification catalyst 44 may be provided downstream side of the reactor 45 in the flow direction of the exhaust gas.

The control device 50 is provided with an electronic control unit (ECU) 51 and various types of sensors. The ECU 51 is comprised of a digital computer, and is provided with a memory 53, processor 55, input port 56, and output port 57, which are connected with each other through a bidirectional bus 52.

At the intake pipe 32, a flow rate sensor (air-flow meter) 61 is provided for detecting the flow rate of air flowing through the intake pipe 32. At the exhaust pipe 42 (or at the exhaust manifold 41) upstream side of the exhaust purification catalyst 44, an air-fuel ratio sensor is provided for detecting the air-fuel ratio of the exhaust gas flowing into the exhaust purification catalyst 44. Further, at the exhaust purification catalyst 44, a temperature sensor 63 is provided for detecting the temperature of the exhaust purification catalyst 44. The outputs of these flow rate sensor 61, air-fuel ratio sensor 62 and temperature sensor 63 are input through corresponding AD converters 58 to the input port 56.

Further, a load sensor 67 generating an output voltage proportional to the amount of depression of an accelerator pedal 66 is connected to the input port 56. The output voltage of the load sensor 67 is input through a corresponding AD converter 58 to the input port 56. A crank angle sensor 68 generates an output pulse every time the crankshaft of the engine body 10 rotates by for example 10 degrees. This output pulse is input to the input port 56. At the CPU 55, the engine speed is calculated from the output pulse.

On the other hand, the output port 57 of the ECU 51 is connected through corresponding driver circuits 59 to the actuators controlling the operation of the internal combustion engine 1. In the example shown in FIG. 1, the output port 57 is connected to the fuel injectors 21, fuel pump 24 and throttle valve drive actuator 37. The ECU 51 outputs control signals controlling these actuators from the output port 57 to control the operation of the internal combustion engine 1.

<Configuration of Electrochemical Reactor>

Figure 2:
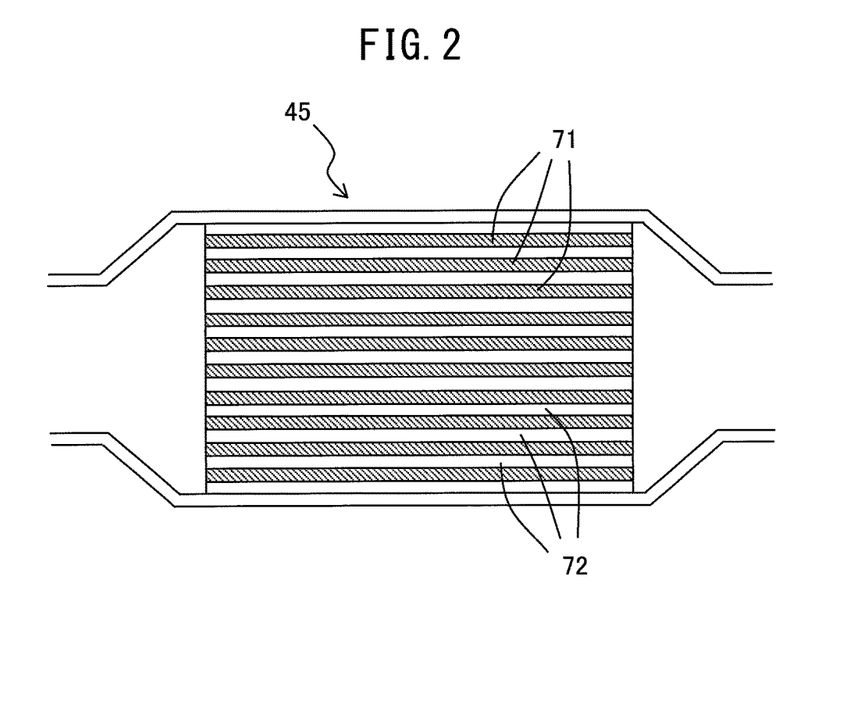
FIG. 2 is a cross-sectional side view of the electrochemical reactor.

Next, referring to FIGS. 2 and 3, the configuration of the reactor 45 according to the present embodiment will be explained. FIG. 2 is a cross-sectional side view of the reactor 45. As shown in FIG. 2, the reactor 45 is provided with partition walls 71 and passages 72 defined by the partition walls. The partition walls 71 are comprised of a plurality of first partition walls extending in parallel with each other and a plurality of second partition walls extending in parallel with each other and perpendicular to the first partition walls. The passages 72 are defined by these first partition walls and second partition walls, and extend in parallel to each other. The exhaust gas flowing into the reactor 45 flows through the plurality of passages 72. Note that the partition walls 71 may be formed only by a plurality of partition walls extending parallel with each other so that the partition walls do not have partition walls extending perpendicular to the plurality of partition walls.

Figure 3:
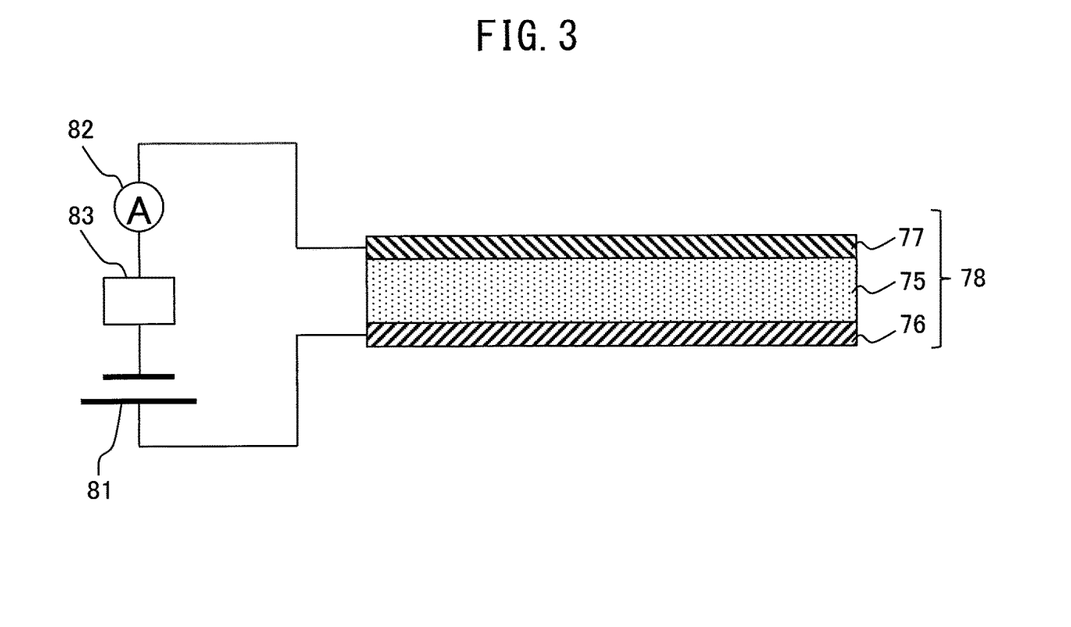
FIG. 3 is an enlarged cross-sectional view of a partition wall of the electrochemical reactor.

FIG. 3 is an enlarged cross-sectional view of a partition wall 71 of the reactor 45. As shown in FIG. 3, a partition wall 71 of the reactor 45 is provided with a solid electrolyte layer 75, an anode layer 76 arranged on one surface of the solid electrolyte layer 75, and a cathode layer 77 arranged on the surface of the solid electrolyte layer 75 at the opposite side to the surface at which the anode layer 76 is arranged. The solid electrolyte layer 75, anode layer 76 and cathode layer 77 form cells 78.

The solid electrolyte layer 75 includes a porous solid electrolyte having proton conductivity. As the solid electrolyte, for example, a perovskite type metal oxide $MM'_{1-x}R_xO_3$-$\alpha$ (M=Ba, Sr, Ca, M'=Ce, Zr, R=Y, Yb, for example, $SrZr_xYb_{1-x}O_3$-$\alpha$, $SrCeO_3$, $BaCeO_3$, $Ca7rO_3$, $SrZrO_3$, etc.), a phosphate (for example, $SiO_2$—$P_2O_5$-based glass, etc.), metal doped $Sn_xIn_{1-x}P_2O_7$ (for example, $SnP_2O_7$, etc.) or zeolite (for example, ZSM-5) are used.

The anode layer 76 and the cathode layer 77 both include Pt, Pd, Rh, or other precious metals. Further, the anode layer 76 includes a substance able to hold (that is, able to adsorb and/or absorb) water molecules. Specifically, the substance able to hold water molecules includes zeolite, silica gel, activated alumina, etc. On the other hand, the cathode layer 77 includes a substance able to hold (that is, able to adsorb and/or absorb) $NO_X$. Specifically, the substance able to hold $NO_X$ includes K, Na, or another alkali metal, Ba or another alkali earth metal, La or another rare earth, etc.

Further, the internal combustion engine 1 is provided with a power system 81, ammeter 82 and voltage adjustment device 83. The positive electrode of the power system 81 is connected to the anode layer 76, while the negative electrode of the power system 81 is connected to the cathode layer 77. The voltage adjustment device 83 is configured to be able to change a voltage applied between the anode layer 76 and cathode layer 77. Further, the voltage adjustment device 83 is configured to be able to change the magnitude of the current provided to the reactor 45 so as to flow from anode layer 76 through the solid electrolyte layer 75 to the cathode layer 77.

The power system 81 is connected to the ammeter 82 in series. Further, the ammeter 82 is connected through a corresponding AD converter 58 to the input port 56. The voltage adjustment device 83 is connected through a corresponding drive circuit 59 to the output port 57 of the ECU 51. The voltage adjustment device 83 is controlled by the ECU 51. Therefore, the voltage adjustment device 83 and ECU 51 function as a voltage control device for controlling the magnitude of voltage applied between the anode layer 76 and the solid electrolyte layer 75 to the cathode layer 77 (in other words, a voltage supplied to the reactor 45).

In the reactor 45 configured as above, if current flows from the power system 81 to the anode layer 76 and the cathode layer 77, reactions such as in the following formulas occur at the anode layer 76 and the cathode layer 77:

Anode side:

Cathode side:

That is, in the anode layer 76, the water molecules held at the anode layer 76 are electrolyzed whereby oxygen and protons are generated. The generated oxygen is released into the exhaust gas, while the generated protons move from the anode layer 76 through the solid electrolyte layer 75 to the cathode layer 77. In the cathode layer 77, the NO held at the cathode layer 77 reacts with the protons and electrons whereby nitrogen and water molecules are generated.

Therefore, according to the present embodiment, by making current flow from the power system 81 of the reactor 45 to the anode layer 76 and the cathode layer 77, it is possible to reduce the NO in the exhaust gas to $N_2$ to remove it.

Further, if unburn HC or CO, etc., is contained in the exhaust gas, the anode layer 76 reacts with the HC or CO by reactions such as in the following formulas to produce carbon dioxide and water. Therefore, according to the present embodiment, HC and CO in the exhaust gas can be oxidized and purified by electrical current flowing from the power system 81 of the reactor 45 through the anode and cathode layers 76 and 77.

Note that, in the above embodiments, the anode layer 76 and the cathode layer 77 are arranged on two surfaces at the opposite sides of the solid electrolyte layer 75. However, the anode layer 76 and the cathode layer 77 may also be arranged on the same surface of the solid electrolyte layer 75. In this case, the protons move through the vicinity of the surface of the solid electrolyte layer 75 at which the anode layer 76 and the cathode layer 77 are arranged.

Figure 4:
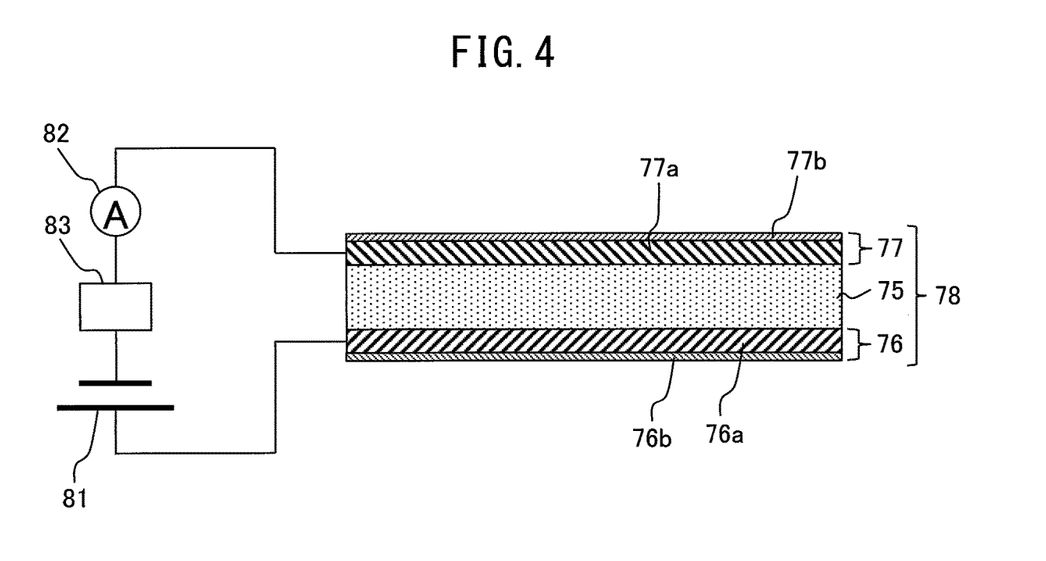
FIG. 4 is an enlarged cross-sectional view of a partition wall of the electrochemical reactor.

Further, as shown in FIG. 4, the anode layer 76 may include two layers of a conductive layer 76a including a precious metal having electroconductivity and a water molecule holding layer 76b including a substance able to hold water molecules. In this case, the conductive layer 76a is arranged on the surface of the solid electrolyte layer 75, while the water molecule holding layer 76b is arranged on the surface of the conductive layer 76a at the opposite side from the solid electrolyte layer 75 side.

Similarly, the cathode layer 77 may include two layers of a conductive layer 77a including a precious metal having electroconductivity and an $NO_X$ holding layer 77b including a substance able to hold $NO_X$. In this case, the conductive layer 77a is arranged on the surface of the solid electrolyte layer 75, while the $NO_X$ holding layer 77b is arranged on the surface of the conductive layer 77a at the opposite side from the solid electrolyte layer 75 side.

Note that, in the present embodiment, the solid electrolyte layer 75 of the reactor 45 includes a proton conductive solid electrolyte. However, the solid electrolyte layer 75 may also be configured to include an oxygen ion conductive solid electrolyte or other ion conductive solid electrolyte, instead of a proton conductive solid electrolyte.

<Circuit Configuration of Electrochemical Reactor>

Figure 5:
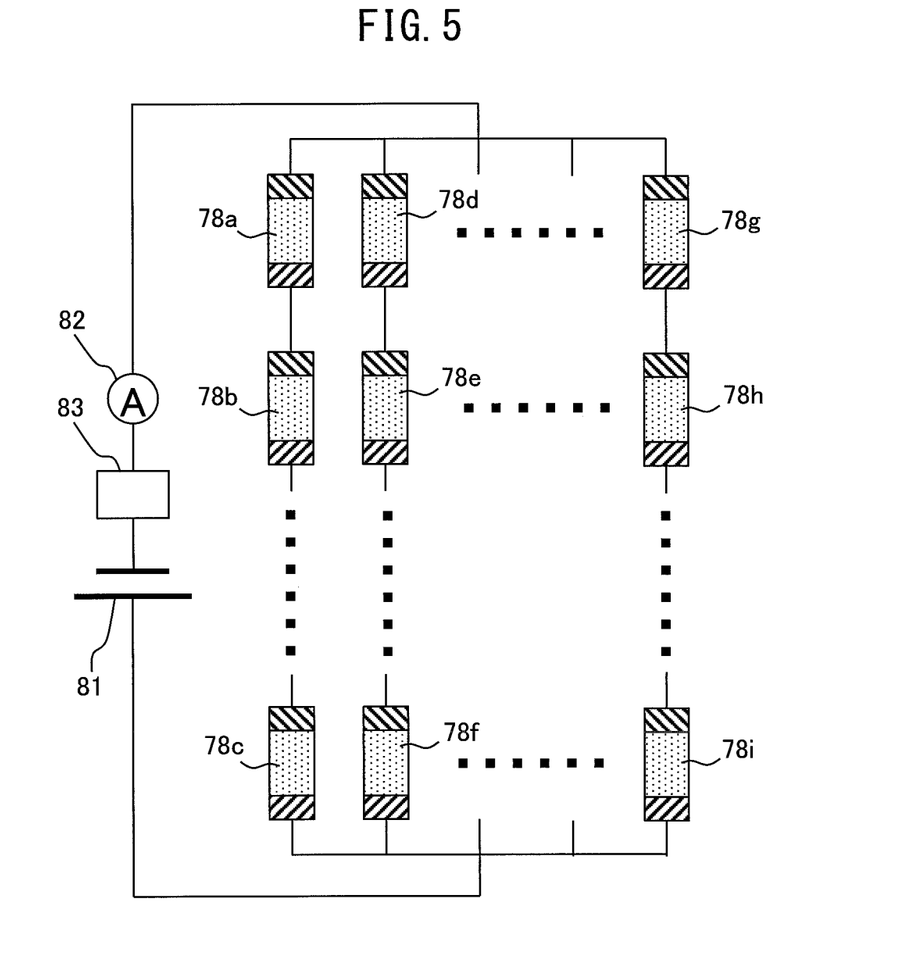
FIG. 5 is a view schematically showing a circuit configuration of the electrochemical reactor.

FIG. 5 is a view schematically showing the circuit configuration of the reactor 45. As shown in FIG. 5, the reactor 45 is provided with a plurality of cells 78 respectively having solid electrolyte layers 75, anode layers 76, and cathode layers 77. Each cell 78 forms part of the partition walls 71 of the reactor 45. Specifically, when the reactor 45 is formed into a honeycomb shape by a first partition wall and a second partition wall vertical to the first partition wall, each cell 78, for example, forms the second partition wall positioned between the adjoining first partition walls and the first partition wall positioned between the adjoining second partition walls. Further, when the reactor 45 is formed from only a plurality of partition walls extending in parallel with each other, each cell 78, for example, forms a single partition wall.

In the present embodiment, as shown in FIG. 5, these plurality of cells 78 are partially connected in series with each other and are partially connected in parallel with each other. In the example shown in FIG. 5, a first cell 78a, second cell 78b, and third cell 78c are connected in series with each other. Therefore, the anode layer 76 of the first cell 78a is connected to the cathode layer 77 of the second cell, while the anode layer 76 of the second cell is connected to the cathode layer 77 of another cell. In the example shown in FIG. 5, similarly, a fourth cell 78d, fifth cell 78e, and sixth cell 78f are connected in series, while a seventh cell 78g, eighth cell 78h, and ninth cell 78i are connected in series. In addition, these series connected cells are connected in parallel with each other.

In the present embodiment, in the structure of the reactor 45, cells 78 of the same extents of ease of pooling of condensed water at the solid electrolyte layer 75 are connected in series with each other. Therefore, cells 78 where condensed water easily pools at the solid electrolyte layer 75 are connected in series with each other. In the same way, cells 78 where condensed water is hard to pool at the solid electrolyte layer 75 are connected with each other in series. On the other hand, in the present embodiment, cells with different extents of ease of pooling of condensed water at the solid electrolyte layer 75 are connected with each other in parallel. Therefore, cells 78 where condensed water easily pools connected in series with each other and cells 78 where condensed water is hard to pool connected in series are connected in parallel to the power device 81.

Note that, in the above embodiment, part of the plurality of cells 78 are connected in series while part are connected in parallel, but all of the plurality of cells may be connected in series and all of the plurality of cells may be connected in parallel.

<Purification by Electrochemical Reactor>

In the internal combustion engine 1 configured as stated above, in particular, at the time of cold start, the exhaust is purified by the reactor 45. In the present embodiment, in the period from when the internal combustion engine 1 is cold started to when the temperature of the exhaust purification catalyst 44 becomes the activation temperature, purification control is performed for applying electric current flow between the anode layers 76 and cathode layers 77 of the cells 78 so as to remove the $NO_X$ in the exhaust gas.

Specifically, the control device 50 detects the temperature of the exhaust purification catalyst 44 by the temperature sensor 63. When the detected temperature is lower than the activation temperature of the exhaust purification catalyst 44, the control device 50 performs the purification control. In the purification control, the control device 50 applies voltage of a value suitable for removing the $NO_X$ (below, also referred to as the "purification voltage value") between the anode layers 76 and cathode layers 77 of the cells 78. As a result, even if temperature of the exhaust purification catalyst 44 is low and the $NO_X$ in the exhaust gas is not sufficiently removed by the exhaust purification catalyst 44, it is possible to remove the $NO_X$ in the exhaust gas by the reactor 45.

On the other hand, if the temperature of the exhaust purification catalyst 44 detected by the temperature sensor 63 becomes equal to or more than the activation temperature, the control device 50 stops the purification control. Therefore, the control device 50 does not apply voltage by the power device 81. If the temperature of the exhaust purification catalyst 44 becomes equal to or more than the activation temperature, it becomes possible to sufficiently remove the $NO_X$ in the exhaust gas by the exhaust purification catalyst 44. Further, if not supplying power to the reactor 45, the power consumption can be kept down.

Therefore, by performing such control, it is possible to keep down the power consumption while suitably removing the $NO_X$ in the exhaust gas.

<Effect of Condensed Water Generated in Electrochemical Reactor>

Figure 6:
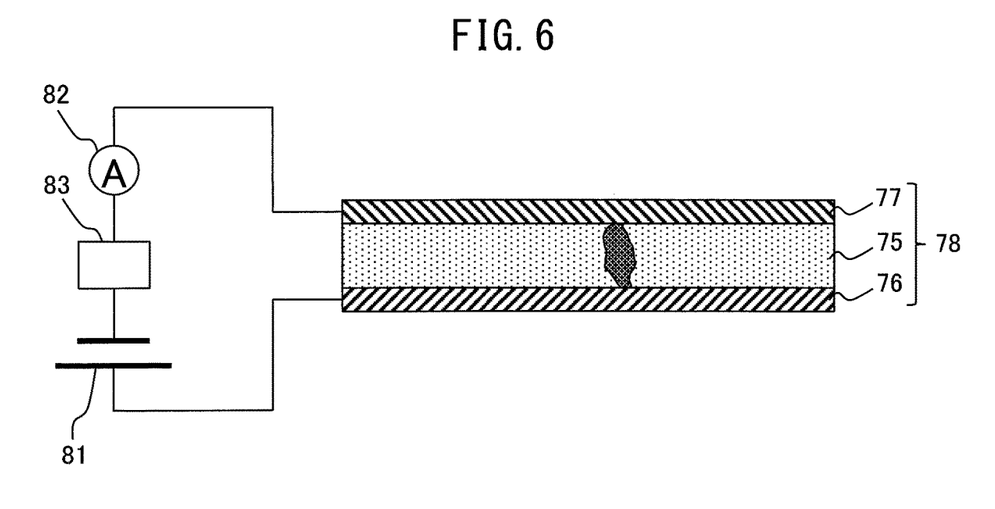
FIG. 6 is an enlarged cross-sectional view of a partition wall of the electrochemical reactor in a state where condensed water has deposited inside of a solid electrolyte layer of the cell.

Next, referring to FIGS. 6 and 7, the effect of condensed water formed at the reactor 45 will be explained. FIG. 6 is an enlarged cross-sectional view of a partition wall 71 of the reactor 45 in the state where condensed water has deposited in the solid electrolyte layer 75 of a cell 78. Further, FIG. 7 is an enlarged cross-sectional view of a partition wall 71 of the reactor 45 in the state where condensed water has deposited between the anode layer 76 and cathode layer 77 of adjoining cells 78.

In this regard, when the internal combustion engine 1 is cold started or while it is stopped, the high temperature exhaust gas is cooled at the reactor 45 and the water vapor in the exhaust gas becomes condensed water which deposits on the reactor 45. Such condensed water deposits inside the solid electrolyte layers 75 of the cells 78 or on the anode layers 76 or on the cathode layers 77 of the cells 78.

If the condensed water depositing in the solid electrolyte layer 75 of a cell 78 becomes greater, as shown in FIG. 6, the condensed water sometimes deposits between the anode layer 76 and the cathode layer 77 so as to traverse the solid electrolyte layer 75. In this case, short-circuiting occurs between the anode layer 76 and the cathode layer 77 of the cell 78.

Figure 7:
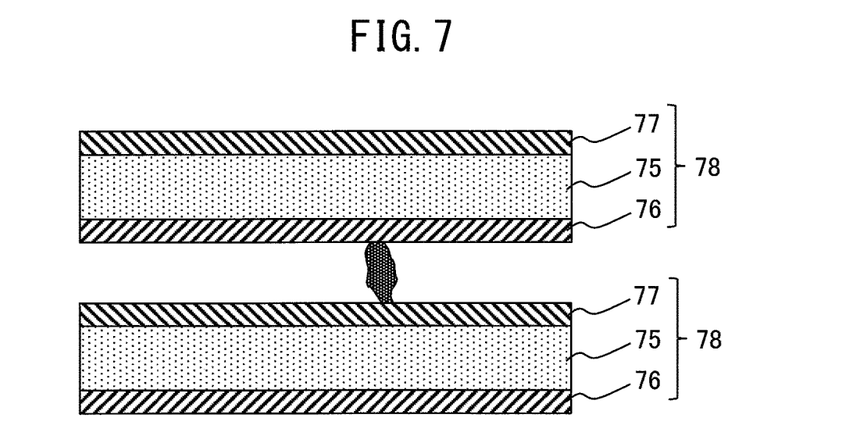
FIG. 7 is an enlarged cross-sectional view of a partition wall of the reactor in a state where condensed water has deposited between an anode layer and cathode layer of adjoining cells.

Further, if the condensed water deposited on the cell 78 becomes greater, as shown in FIG. 7, sometimes condensed water deposits so as to traverse the space between the anode layer 76 of one cell 78 of two adjoining cells 78 and the cathode layer 77 of the other cell 78 of the two adjoining cells 78. In this case, short-circuiting occurs between the anode layer 76 and cathode layer 77 of two adjoining cells 78.

If short-circuiting occurs at a cell 78 of the reactor 45 in this way, at the cell 78, even if applying voltage between the anode layer 76 and the cathode layer 77, no movement of protons (or ions) occurs through the solid electrolyte layer 75. For this reason, at the cell 78, it is not possible to remove the $NO_X$ in the exhaust gas.

<Control of Formation of Condensed Water>

Therefore, in the present embodiment, the control device 50 performs short-circuit detection control for detecting short-circuiting of an anode layer 76 and a cathode layer 77, and energizing control for applying current between the anode layer 76 and the cathode layer 77 so as to energize the short-circuited part when short-circuiting is detected.

Figure 8:
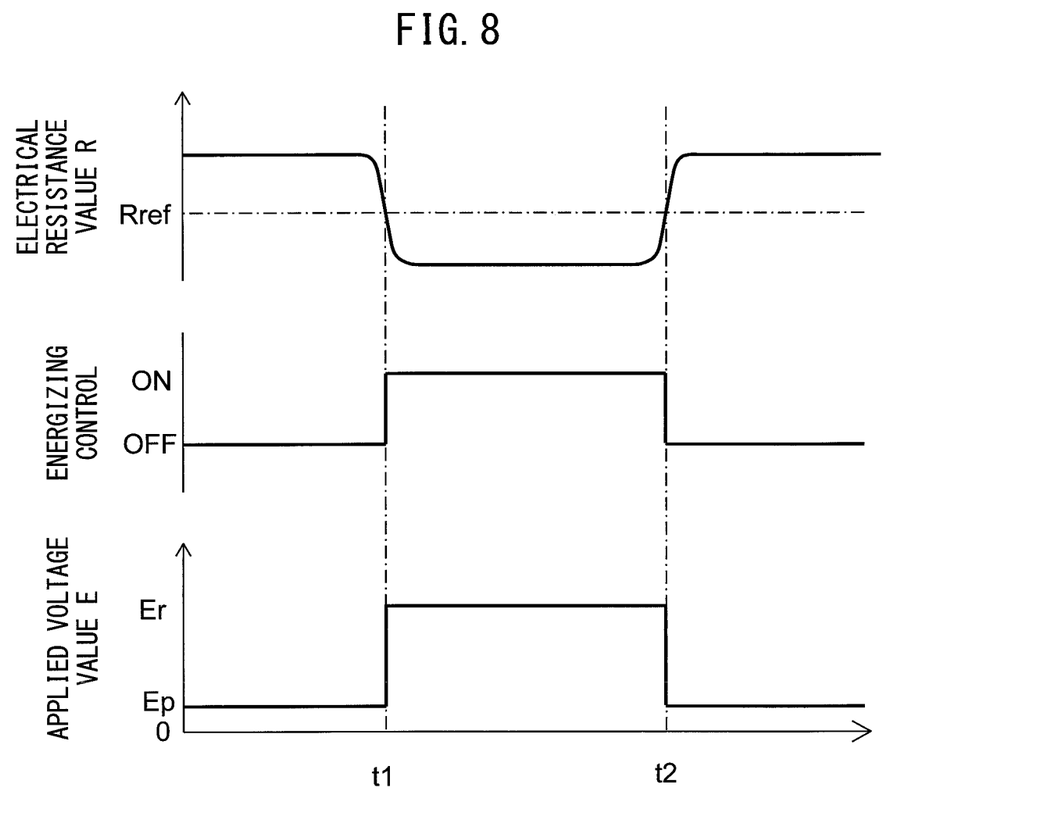
FIG. 8 is a time chart of an electrical resistance value, ON/OFF of energizing control, and applied voltage value E when short-circuit detection control and energizing control are performed while the internal combustion engine is operating.

FIG. 8 is a time chart of an electrical resistance value R between the anode layer 76 and the cathode layer 77 of a cell 78, ON/OFF of energizing control, and applied voltage value E between the anode layer 76 and the cathode layer 77, when short-circuit detection control and energizing control are performed while the internal combustion engine 1 is operating.

In the example shown in FIG. 8, before the time t1, purification control is performed. For this reason, before the time t1, voltage of the purification voltage value Ep is applied between the anode layer 76 and the cathode layer 77 of a cell 78 (below, such a case also referred to as "voltage is applied to a cell"). Further, at this time, the electrical resistance value R of the solid electrolyte layer 75 of the cell 78 (below, also referred to as the "electrical resistance value of the cell") is detected based on the voltage value applied by the power device 81 and the current value detected by the ammeter 82. Further, short-circuiting between the anode layer 76 and the cathode layer 77 (below, also referred to as "short-circuiting of the cell") is detected based on the electrical resistance value R of the cell 78 detected in such a way. Such a detected electrical resistance value R is used for detecting short-circuiting of the cell 78, therefore, at this time, at the control device 50, it can be said that short-circuit detection control is being performed. Note that, when a plurality of cells 78 are connected in series, the electrical resistance value R of the plurality of cells 78 as a whole is detected.

If short-circuiting occurs in a cell 78, the electrical resistance value R of the cell 78 becomes smaller. Therefore, in the present embodiment, if the detected electrical resistance value R is equal to or less than a preset reference value Rref, the control device 50 judges that short-circuiting has occurred in the cell 78. In the example shown in FIG. 8, at the time t1, the electrical resistance value R of the cell 78 becomes equal to or less than the reference value Rref, therefore at the time t1, it is judged that short-circuiting has occurred at the cell 78.

Note that, when a plurality of cells 78 are connected in series, the electrical resistance value when short-circuiting occurs in one cell among the series connected plurality of cells 78 is set as the reference value. Therefore, if the electrical resistance value R of the plurality of cells 78 as a whole is equal to or less than the reference value, it is judged that short-circuiting has occurred in at least one of the plurality of cells 78.

If at the time t1 it is judged that short-circuiting has occurred at a cell 78, energizing control is started. During energizing control, voltage of a value Er higher than the purification voltage during purification control (below, also referred to as the "water removal voltage value") is applied to the cell 78, so that the short-circuited part is energized. Note that, when a plurality of cells 78 are connected in series, a voltage obtained by multiplying the number of cells 78 connected in series with Er is applied to the series connected plurality of cells 78 as a whole.

If a high voltage is applied to a cell 78 in which short-circuiting has occurred due to condensed water in this way, the condensed water is removed. Specifically, by applying a high voltage to the condensed water deposited so as to short-circuit the anode layer 76 and the cathode layer 77, electrolysis of water can occur. In this case, the condensed water is broken down into hydrogen and oxygen. As a result, oxygen is generated from the anode layer 76 and hydrogen is generated from the cathode layer 77. By electrolysis in such a way, the condensed water is removed. Further, by applying high voltage to the condensed water deposited so as to short-circuit the anode layer 76 and the cathode layer 77, the condensed water acts as resistance and Joule's heat can be generated at the condensed water. In this case, due to the thus generated Joule's heat, the condensed water is heated to evaporate. As a result, the condensed water is removed. By applying a high voltage to the cell 78 at which short-circuiting occurs due to the condensed water in this way, it is possible to remove the condensed water in the solid electrolyte layer 75 of the cell 78 or the condensed water between adjoining cells 78.

If condensed water is removed by energizing control, the short-circuiting occurring at the cell 78 is eliminated. As a result, at the time t2, the electrical resistance value R of the cell 78 where short-circuiting occurred becomes larger exceeding the reference value Rref. If in this way the electrical resistance value R becomes larger exceeding the reference value Rref, it is judged that the short-circuiting has been eliminated and the energizing control is made to end.

Therefore, the voltage applied to the cell 78 is made to decrease from the water removal voltage value Er to the purification voltage value Ep.

Figure 9:
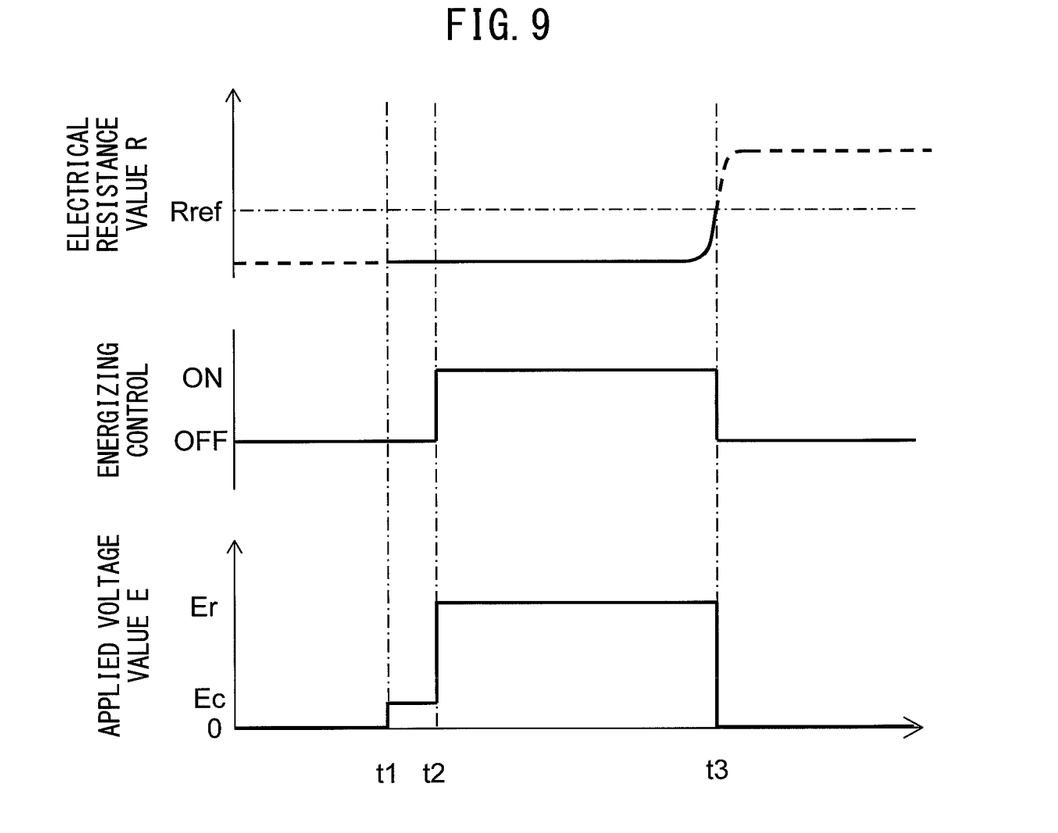
FIG. 9 is a time chart of an electrical resistance value, ON/OFF of energizing control, and applied voltage value E when short-circuit detection control and energizing control are performed while the internal combustion engine is stopped.

FIG. 9 is a time chart of an electrical resistance value R, ON/OFF of energizing control, and applied voltage value E, when short-circuit detection control and energizing control are performed while the internal combustion engine 1 is stopped.

In the example shown in FIG. 9, before the time t1, the internal combustion engine 1 is stopped. Therefore, before the time t1, voltage is not applied to the cells 78. Further, the electrical resistance values R of the cells 78 are not detected.

After that, at the time t1, short-circuit detection control is started. The short-circuit detection control while the internal combustion engine 1 is stopped may, for example, be performed at every certain time interval. It may also be performed when a door of the vehicle mounting the internal combustion engine 1 is opened or otherwise when the internal combustion engine 1 is expected to be soon started up. If short-circuit detection control is started, voltage for detecting short-circuiting is applied between the anode layer 76 and the cathode layer 77 of a cell 78. The voltage value Ec for short-circuit detection is a relatively small value. For example, it is equal to or less than the purification voltage value Ep. In the state where the voltage for short-circuit detection is applied in this way, the electrical resistance value R of the cell 78 is detected.

At this time, if short-circuiting does not occur at the cell 78, the electrical resistance value R of the cell 78 rises exceeding the reference value Rref. However, if short-circuiting occurs at the cell 78, as shown in FIG. 9, the value is maintained at equal to or less than the reference value Rref. Therefore, at the time t2 when a predetermined time has elapsed from the start of the short-circuit detection control at the time t1, if the electrical resistance value R is higher than the reference value Rref, it is judged that short-circuiting has not occurred at the cell 78 and short-circuit detection control is ended. On the other hand, if at the time t2 the electrical resistance value R is equal to or less than the reference value Rref, it is judged that short-circuiting has occurred at the cell 78 and energizing control is started.

If at the time t2 the energizing control is started, the voltage applied to the cell 78 is set to a water removal voltage value Er in order to eliminate short-circuiting occurring at a cell 78. After that, at the time t3, if the electrical resistance value R of the cell 78 becomes larger exceeding the reference value Rref, it is judged that short-circuiting has been eliminated and energizing control is ended. Therefore, the voltage applied to the cell 78 is set to zero.

<Flow Chart>

Figure 10:
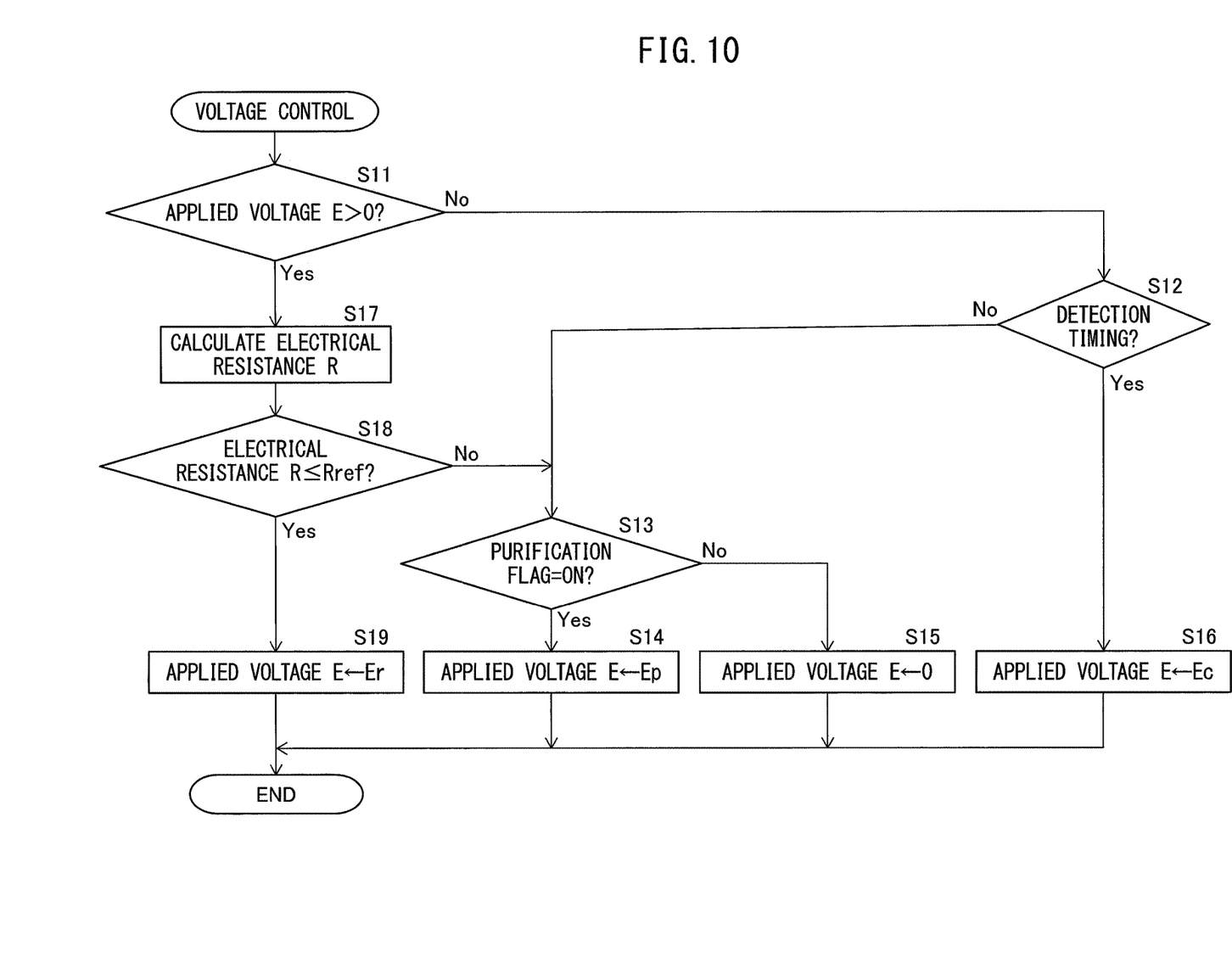
FIG. 10 is a flow chart of a control routine for controlling a voltage applied to a cell of a reactor.

FIG. 10 is a flow chart of a control routine for controlling the voltage applied to a cell 78 of the reactor 45. The illustrated control routine is performed every certain time interval.

First, at step S11, it is judged if the current applied voltage value E of the cell 78 is larger than zero. If the current applied voltage value E of the cell 78 is zero, for example, due to the internal combustion engine 1 being stopped, the control routine proceeds to step S12. At step S12, it is judged if the current timing is detection timing for detecting short-circuiting of the cell 78. At step S12, if, for example, the time elapsed from when the previous detection of short-circuiting ended is equal to or more than a certain time or a door of the vehicle mounting the stopped internal combustion engine 1 is opened, it is judged that the current timing is detection timing for detecting short-circuiting of the cell 78. If at step S12 it is judged that the current timing is not detection timing for short-circuiting, the control routine proceeds to step S13.

At step S13, it is judged if the purification flag is ON. The purification flag is a flag which is set ON when purification by the reactor 45 is necessary, that is, for example, when the internal combustion engine 1 is operating and the temperature of the exhaust purification catalyst 44 detected by the temperature sensor 63 is less than the activation temperature, and which is set OFF at other times. If at step S13 it is judged that the purification flag is set ON, the applied voltage value E of the cell 78 is set to the purification voltage value Ep whereby purification control is performed. On the other hand, if at step S13 it is judged that the purification flag is set OFF, the applied voltage value E of the cell 78 is set to zero.

On the other hand, if, at step S12, it is judged that the timing is that for detection of short-circuiting, the control routine proceeds to step S16. At step S16, for short-circuit detection control, the applied voltage value E to the cell 78 is set to the short-circuit detection voltage value Ec.

At step S16, if the applied voltage value E is set to a short-circuit detection voltage value Ec or if the applied voltage value E is set to the purification voltage value Ep at step S14, the next control routine proceeds from step S11 to step S17. At step S17, the electrical resistance value R of the cell 78 is calculated based on the value of the voltage applied by the power device 81 and the current value detected by the ammeter 82.

Next, at step S18, it is judged if the electrical resistance value R calculated at step S17 is equal to or less than the reference value Rref. If at step S18 it is judged that the electrical resistance value R is equal to or less than the reference value Rref, that is, if it is judged that short-circuiting has occurred at the cell 78, the routine proceeds to step S19. At step S19, the applied voltage value E is set to a water removal voltage value Er. On the other hand, if at step S18 it is judged that the electrical resistance value R is larger than the reference value Rref, that is, if it is judged that short-circuiting has not occurred at the cell 78, the routine proceeds to step S13.

<Action and Effects>

In the present embodiment, as explained above, when short-circuiting of a cell 78 due to condensed water is detected, energizing control is performed applying current between the anode layer 76 and the cathode layer 77 of the cell 78. By performing this energizing control, short-circuiting of the cell 78 due to the condensed water is eliminated earlier, therefore it is possible to keep the purification function of the reactor 45 from decreasing due to the short-circuiting of the cell 78.

Further, in the present embodiment, a plurality of cells 78 forming the reactor 45 are partially connected in parallel. By connecting the cells 78 in parallel in this way, if short-circuiting occurs in part of the cells 78, the electrical resistance value of the cells 78 where short-circuiting occurs becomes smaller, therefore current easily flows to the cells 78. As a result, it becomes easy to remove condensed water of the cells 78 by electrolysis or Joule heating.

In particular, in the present embodiment, cells 78 where condensed water easily pools are connected in series. Here, if the cells 78 where condensed water easily pools are connected in parallel, if short-circuiting occurs at these cells 78, the current is dispersed among these parallel circuits and the currents flowing through these cells 78 become smaller. As opposed to this, according to the present embodiment, the cells 78 where condensed water easily pools are connected in series, therefore if short-circuiting occurs at these cells 78, the current flowing through these cells 78 become larger and accordingly removal of condensed water can be promoted.

Preferred embodiments according to the present invention were explained, but the present invention is not limited to these embodiments and can be modified and changed in various ways within the language of the claims.

For example, in the above embodiments, the voltage applied to the cells 78 during energizing control is higher than the voltage applied to the cells 78 during purification control. However, the voltage applied to the cells 78 during energizing control may be the same extent as the voltage applied to the cells 78 during purification control.

Further, for example, if connecting at least part of a plurality of cells in parallel with each other, a switch switching between connection and disconnection of the circuit for the parallel connected cells may also be provided. In this case, in energizing control, the switch is operated so that current flows through a cell 78 where short-circuiting occurs and current does not flow through cells 78 connected with that cell 78 in parallel.

The invention claimed is:

1. An exhaust purification system of an internal combustion engine, comprising:
    an electrochemical reactor provided in an exhaust passage of the internal combustion engine; and
    a voltage control device controlling a voltage supplied to the electrochemical reactor, wherein
        the electrochemical reactor comprises an ion conducting solid electrolyte layer and an anode layer and cathode layer placed on the surface of the solid electrolyte layer, and
        the voltage control device is programmed to perform short-circuit detection control detecting short-circuiting between the anode layer and the cathode layer, and energizing control applying current between the anode layer and the cathode layer so as to energize the short-circuited part when short-circuiting is detected.

2. The exhaust purification system of an internal combustion engine according to claim 1, wherein
    the voltage control device is programmed to further perform, while the internal combustion engine is operating, purification control applying current between the anode layer and cathode layer so as to remove NOx in the exhaust gas discharged from the internal combustion engine, and
    the value of the voltage applied between the anode layer and cathode layer during the energizing control is higher than the value of the voltage applied between the anode layer and cathode layer during the purification control.

3. The exhaust purification system of an internal combustion engine according to claim 1, wherein, in the short-circuit detection control, the voltage control device detects short-circuiting between the anode layer and the cathode layer based on an electrical resistance value between the anode layer and the cathode layer when voltage is applied between the anode layer and the cathode layer.

4. The exhaust purification system of an internal combustion engine according to claim 1, wherein the electrochemical reactor has a plurality of cells respectively comprising solid electrolyte layers, anode layers, and cathode layers, and these plurality of cells are partially connected in parallel to a power source.

5. The exhaust purification system of an internal combustion engine according to claim 4, wherein among the plurality of cells, cells where condensed water easily pools on the solid electrolyte layer in the structure of the electrochemical reactor are connected in series with each other.

6. The exhaust purification system of an internal combustion engine according to claim 1, wherein the voltage control device is programmed so as to perform the short-circuit detection control and the energizing control while the internal combustion engine is stopped.

* * * * *